United States Patent [19]

Lese et al.

[11] 4,318,801
[45] Mar. 9, 1982

[54] SUPPORTED NICKEL-MOLYBDENUM CATALYST, PREPARATION THEREOF, AND HYDRODESULFURIZATION OF HYDROCARBON FRACTIONS USING SAME

[75] Inventors: Henri K. Lese, Monroeville; Raynor T. Sebulsky; John J. Stanulonis, both of Pittsburgh; Joseph A. Tabacek, New Kensington; Roger F. Vogel, Bulter, all of Pa.

[73] Assignee: Gulf Research & Development Company, Pittsburgh, Pa.

[21] Appl. No.: 72,233

[22] Filed: Sep. 4, 1979

[51] Int. Cl.³ .................. C10G 45/04; C10G 45/60; B01J 27/02; B01J 23/64
[52] U.S. Cl. .................. 208/216 R; 208/217; 208/254 H; 208/251 H; 252/436; 252/440; 252/465; 252/466 R; 252/470
[58] Field of Search .......... 208/251 H, 254 H, 216 R, 208/216 PP, 217; 252/470, 465, 466 R, 440, 436, 438, 437

[56] References Cited

U.S. PATENT DOCUMENTS

| 2,486,361 | 10/1949 | Walin | 208/137 |
|---|---|---|---|
| 2,647,857 | 8/1953 | Horne | 208/217 |
| 2,748,062 | 5/1956 | Doumani | 252/440 |
| 2,871,200 | 1/1959 | Doumani | 252/440 |
| 2,871,201 | 1/1959 | Doumani | 252/440 |
| 3,210,293 | 10/1965 | O'Hara | 208/251 H |
| 3,223,652 | 12/1965 | Erickson et al. | 208/217 |
| 3,285,860 | 11/1966 | Richardson | 208/254 H |
| 3,294,659 | 12/1966 | O'Hara | 208/254 H |
| 3,546,104 | 12/1970 | Kuwata et al. | 208/216 |
| 3,746,661 | 7/1973 | O'Hara | 252/470 |
| 3,749,664 | 7/1973 | Mickleson | 208/217 |
| 3,923,646 | 12/1975 | Hilfman | 208/216 R |
| 4,046,714 | 9/1977 | O'Hara | 252/470 |
| 4,083,771 | 4/1978 | O'Hara | 208/216 |

FOREIGN PATENT DOCUMENTS 668664 8/1963 Canada ........................ 208/254 R

Primary Examiner—Gary P. Straub
Attorney, Agent, or Firm—Deane E. Keith; Forrest D. Stine; Alvin E. Ring

[57] ABSTRACT

A nickel-molybdenum catalyst composite is formed by a process which consists essentially of contacting a refractory inorganic oxide support with an aqueous, alkaline impregnating solution consisting essentially of $NH^+_4$, $Ni^{++}$, $SO_4^-$ and $MO^{+VI}$, with substantially all of the $Ni^{++}$ being supplied from nickel sulfate, and heating said impregnated support to dry and calcine the catalyst composite. The calcination is an oxidative calcination conducted in the presence of an oxygen-containing gas at a temperature in the range of 427° and about 566° C. such that sulfate remains on said support. The resulting catalyst is used to desulfurize naphthas, middle distillate oils and asphaltic oils.

56 Claims, 2 Drawing Figures

SULFATE CONTENT CATALYST AS FUNCTION OF FINAL CALCINATION TEMPERATURE

FINAL CALCINATION TEMPERATURE °C (°F)

SUPPORTED NICKEL-MOLYBDENUM CATALYST, PREPARATION THEREOF, AND HYDRODESULFURIZATION OF HYDROCARBON FRACTIONS USING SAME

CROSS-REFERENCES TO RELATED APPLICATIONS

Reference is made to the following U.S. applications filed of even date:

U.S. patent application Ser. No. 72,236 to John J. Stanulonis, Joseph A Tabacek, and Roger F. Vogel entitled "Hydrogenation Catalyst and Manufacture Thereof".

U.S. patent application Ser. No. 72,237 to John J. Stanulonis, Joseph A Tabacek, and Roger F. Vogel entitled "Impregnating Solution For Hydrogenation Catalyst Manufacture And Production Thereof".

U.S. patent application Ser. No. 72,239 to Henri K. Lese, John J. Stanulonis, Joseph A. Tabacek, and Roger F. Vogel entitled "Desulfurization of Middle Distillate Oil With Supported Nickel-Molybdenum Catalyst".

U.S. patent application Ser. No. 72,238 to John J. Stanulonis, Joseph A. Tabacek, and Roger F. Vogel entitled "Desulfurization Of Naphtha With Supported Nickel-Molybdenum Catalyst".

The foregoing applications are hereby incorporated by reference.

FIELD OF THE INVENTION

The present invention relates to a hydrogenation catalyst, to the method of manufacture of such catalyst and its use for hydrodesulfurization of hydrocarbons. More particularly, this invention relates to a nickel-molybdenum catalyst produced by the impregnation of a support in single step, which catalyst is highly active for the removal of sulfur from various hydrocarbon feedstocks, including naphthas, middle distillate oils and asphalt-containing fractions, and to the use of the catalyst for desulfurization of such feedstocks.

DESCRIPTION OF THE PRIOR ART

It is well known in the art to remove sulfur from petroleum hydrocarbon fractions by subjecting them to treatment with hydrogen under elevated temperatures and pressures while in contact with a catalyst containing hydrogenating components. Such fractions include naphthas, e.g., a fraction in the $C_5$ to 400° F. (204° C.) boiling range; a middle distillate fraction boiling in the 365° to 650° F. (185° to 343° C.) range; a heavy gas oil fraction boiling in the 650° to 1040° F. (343° to 560° C.) boiling range; and a residual fraction, e.g., a fraction having an initial boiling point of 650° F. (343° C.) and containing asphalt.

Typically, Group VI and Group VIII metals, or their oxides and sulfides, have been employed as the metallic components of the catalyst. For example, a catalyst that has been utilized commercially in the hydrodesulfurization of an asphalt-containing crude oil charge is a nickel-cobalt-molybdenum on alumina catalyst. Such catalyst provides a high level of activity for hydrodesulfurization so as to reduce the sulfur content of the charge to a low desired level. Such catalyst and hydrodesulfurization process is disclosed, for example, in U.S. Pat. No. Re. 29,315 to Carlson et al.

Various techniques have been utilized for depositing the metals onto a catalyst support, such as precipitation, impregnation, or the like. The treated catalyst support is heated to dry the catalyst, and thereafter, the catalyst composite is calcined by heating at elevated temperatures.

For example, the impregnation of Group VIB and Group VIII metals onto a catalyst support to provide a hydrorefining catalyst for petroleum hydrocarbon fractions is disclosed in U.S. Pat. No. 4,046,714 to O'Hara, wherein an aqueous solution comprising a bimetallic anionic complex of Group VIB and Group VIII metals is utilized for impregnating the support. The examples in columns 5 and 6 of the O'Hara patent are presented as demonstrating that the production of the catalyst from the anionic complex of Group VIB and Group VIII metals yields a more active catalyst than when the catalyst is derived solely from a simple salt of the Group VIII metal, i.e., cobalt. The examples further indicate that when the cobalt is derived partially from the anionic complex and partially from a simple salt of cobalt, the resulting catalyst is more active than that derived solely from the complex or solely from the simple cobalt salt.

It would be advantageous to provide a highly active hydrogenation catalyst in which the cobalt could be eliminated altogether. Likewise, it would be advantageous to provide a hydrodesulfurization process for naphthas, middle distillate oils and asphaltic oils employing a highly active hydrodesulfurization catalyst in which the cobalt could be eliminated altogether. Cobalt is expensive and in short supply. Moreover, it would be desirable to provide a process for hydrodesulfurization of naphthas, middle distillate oils and residual oils using a catalyst that is formed from an impregnating solution produced wholly from a simple salt of a Group VIII metal and without using a bimetallic complex of the Group VIII metal for preparing the impregnating solution.

SUMMARY OF THE INVENTION

It has now been found that the hydrodesulfurization of naphthas, middle distillate oils and asphaltic oils can be conducted using a supported nickel-molybdenum catalyst which can be cobalt-free, and still have an activity for desulfurization which is equal to or greater than that provided by commercially available NiCoMo and CoMo hydrodesulfurization catalysts.

The hydrodesulfurization processes of the present invention utilize a supported nickel-molybdenum catalyst wherein the nickel is derived from an ammoniacal solution of nickel sulfate and not from a bimetallic complex. Although the catalyst of the present invention is more active than commercial catalysts for removal of sulfur from naphthas and middle distillate oils, it is less active for desulfurization of straight run heavy gas oils, such as a fraction boiling in the 650° to 1040° F. (343° to 560° C.) range. Thus, it was highly surprising to discover that the very same nickel-molybdenum composition constituted a highly active hydrodesulfurization catalyst for asphaltic oils, particularly since the heavy gas oil has a boiling range within the 650° F.+(343° C.+) boiling range of the asphaltic oils of the present invention.

Moreover, the hydrodesulfurization catalyst of the present invention is even more effective for desulfurization of asphaltic oils than commercially available NiCoMo catalysts when the amount of nickel and molybdenum is lower than that found most effective for desulfurization of naphthas and middle distillate oils.

The hydrodesulfurization catalyst of the present invention can be produced by utilizing an ammoniacal impregnating solution that is prepared by admixing nickel sulfate, preferably predissolved nickel sulfate, i.e., an ammoniacal solution of nickel sulfate, with an ammoniacal solution of a $Mo^{+VI}$ oxide, to form an ammoniacal impregnating solution in which nickel and molybdenum are highly compatible.

By predissolving the nickel sulfate in an ammoniacal solution before admixture with the ammoniacal solution of the molybdenum oxide, a smaller volume of solvent is required to form the impregnating solution. Thus, a higher weight or loading of nickel and molybdenum per unit volume of solution is provided, as compared with the addition of undissolved nickel sulfate directly to the ammoniacal molybdenum solution. Such higher metals content in a given volume of solvent provides a particular advantage when utilizing the minimum volume "incipient wetness" technique. The impregnating solution is applied to the supporting material in single step employing the incipient wetness technique of impregnation. Thus, a predetermined volume of the present impregnating solution containing a desired nickel to molybdenum ratio is utilized to impregnate the catalyst support, and there is virtually no excess liquid.

Thereafter, the catalyst is heated so as to drive off the alkaline component, e.g., ammonia, and reduce the pH to trigger the deposition of the metals from the impregnating solution onto the support, and then drive off the water to dry the catalyst composite. The dried catalyst is then calcined.

The resulting NiMo catalyst composite constitutes a highly active hydrodesulfurization catalyst for the removal of sulfur from naphthas, middle distillate oils and asphalt-containing fractions, such as a residual oil or full range crude.

DESCRIPTION OF THE PREFERRED EMBODIMENTS

The present catalyst is useful for removal of sulfur from straight run, coker or synthetic naphtha and middle distillate feedstocks, and is also effective for desulfurizing straight run petroleum or synthetic asphalt-containing feedstocks. Thus, the catalyst of the present invention may be utilized for sulfur removal from any asphaltic-containing or asphaltic hydrocarbon feedstock including petroleum crude, residual oil, coal liquids, oil from tar sands, shale oil, and the like, which contain "asphalt".

The term "asphalt" or "asphaltic" as employed herein is intended to include the resins and asphaltenes present in crude oil. Asphalt can constitute approximately less than 1 to 30 percent by volume or more of crude oil and is present in the residues obtained from distillation of crude or synthetic oils. Asphaltenes are highly aromatic and consist of large molecules of fused aromatic rings and normally contain the most refractory sulfur of any fraction of a full range crude. Unlike other crude fractions, asphalt also contains metals, principally nickel and vanadium.

Any suitable hydrodesulfurization process conditions may be utilized for desulfurization of asphalt-containing oils including a hydrogen partial pressure of 500 to 5000 pounds per square inch (35 to 350 kg/cm$^2$), generally, 1000 to 3000 pounds per square inch (70 to 210 kg/cm$^2$), preferably, and 1000 to 2500 pounds per square inch (70 to 175 kg/cm$^2$) most preferably.

The gas circulation rate can be between about 2000 and 20,000 standard cubic feet per barrel (356 and 3560 cubic meters/cubic meter), generally, or preferably about 3000 to 10,000 standard cubic feet per barrel of gas (534 and 1780 cubic meters/cubic meter) preferably containing 85 percent or more of hydrogen. Reactor temperatures can range between about 500° F. (260° C.) and about 900° F. (482° C.) generally, and between about 650° F. (343° C.) and 800° F. (427° C.), preferably. The liquid hourly space velocity can be between about 0.2 and 10, generally, or between about 0.2 and 2.0 preferably.

A preferred NiMo catalyst of the present invention for use in hydrodesulfurization of asphalt-containing fractions contains between about 0.5 and about 8, preferably between 1 and about 5 percent by weight nickel and between about 4 and about 20, preferably between 5 and about 15 percent by weight molybdenum based upon the total catalyst weight. An especially preferred catalyst contains 3 weight percent nickel and 8 weight percent molybdenum.

As previously indicated, the catalyst of the present invention is also suitable for the desulfurization of naphthas, namely, a hydrocarbon fraction boiling about in the C$_5$450° F. (232° C.) range, and is considerably superior to conventional cobalt-containing catalysts for such purpose.

Thus, suitable temperatures for use in contacting the naphtha feedstock with the catalyst of the present invention include those in the range of between about 400° and about 800° F. (204° to 427° C.), preferably, between about 450° and about 800° F. (230° to 427° C.) utilizing a hydrogen partial pressure of between about 10 and about 1500 pounds per square inch (0.7 to 105 kg/cm$^2$), preferably between 50 and about 1000 pounds per square inch (3.5 to 70 kg/cm$^2$). A gas circulation rate can be between about 150 and about 8000 standard cubic feet per barrel (8.9 to 1424 cubic meters/cubic meter), preferably between 150 and about 5000 standard cubic feet per barrel (26.7 to 890 cubic meters/cubic meter) containing 70 percent or more of hydrogen. The liquid hourly space velocity can be between about 0.6 and about 10, preferably between about one and about 8 volumes of oil per volume of catalyst per hour.

A suitable NiMo catalyst of the present invention for use in desulfurization of naphtha fractions contains between 1 and about 10 percent by weight nickel, preferably between about 2.5 to about 7.5 percent by weight nickel; and between about 4 and about 25 percent by weight molybdenum, preferably between about 7 and about 20 weight percent molybdenum.

The catalyst of the present invention is advantageous in the desulfurization of a middle distillate oil having a boiling range between about 365° F. (185° C.) to about 650° F. (343° C.), which middle distillate fraction boils just above the naphtha range.

Suitable temperatures for use in contacting a middle distillate oil feedstock with the catalyst of the present invention include those in the range of between about 500° and about 800° F. (260° to 427° C.), preferably between about 550° and about 700° F. (288° to 371° C.) utilizing a hydrogen partial pressure of between about 100 and about 600 pounds per square inch (7 to 42 kg/cm$^2$), preferably between 200 and about 400 pounds per square inch (14 to 28 kg/cm$^2$). A gas circulation rate can be between about 400 and about 2500 standard cubic feet per barrel (71 to 445 cubic meters/cubic meter), preferably between 400 and about 1250 standard feet per barrel (71 to 222 cubic meters/cubic meter) containing 70 percent or more of hydrogen. The liquid hourly space velocity can be between about one and about 10, preferably between about 3 and about 7 volumes of oil per volume of catalyst per hour.

A preferred NiMo catalyst of the present invention for use in desulfurization of middle distillate fractions contains between 1 and about 10 percent by weight nickel, preferably between about 2.5 to 7.5 percent by weight nickel, and between about 4 and about 25 percent by weight molybdenum, preferably between about 7 and 20 weight percent molybdenum based upon the total catalyst weight.

Thus, a higher metal loading of the nickel and molybdenum is preferred for the catalysts of this invention used to desulfurize naphtha and middle distillate oils as compared with catalysts of the invention used for the hydrodesulfurization of the asphalt-containing fractions.

As previously indicated, the catalyst utilized in the hydrodesulfurization process of the present invention is preferably produced by utilizing an impregnating solution which consists essentially of an admixture of (A) an ammoniacal solution of nickel sulfate and (B) an ammoniacal solution of a $Mo^{+VI}$ oxide. The ammoniacal solution of nickel sulfate may be prepared by completely dissolving the required amount of nickel sulfate in ammonium hydroxide so that all of the nickel in the final catalyst is derived from nickel sulfate. Thus, it is preferred that the ions, $Ni^{++}$ and $SO_4^{--}$ be present in the impregnation solution in a ratio of substantially 1 to 1. The term "nickel sulfate" as used herein includes both nickel sulfate and suitable hydrates thereof, such as nickel sulfate hexahydrate. The ammoniacal solution of the $Mo^{+VI}$ oxide is separately prepared. A suitable ammoniacal solution of the $Mo^{+VI}$ oxide comprises, for example, an aqueous solution of ammonium heptamolybdate, $(NH_4)_6Mo_7O_{24} \cdot 4H_2O$ in ammonium hydroxide, or it may be provided, for example, by dissolving molybdenum trioxide or molybdic acid in ammonium hydroxide.

The impregnating solution can be produced by admixing the ammoniacal solution of the nickel sulfate with the ammoniacal solution of the $MO^{+VI}$ oxide under any suitable conditions. Preferably, the respective ammoniacal solutions are admixed under ambient temperature and pressure conditions. However, any temperature and pressure conditions can be employed at which vaporization of the alkaline component, e.g., ammonia, and water is avoided and at which salts remain in solution.

It is essential that an alkaline, ammoniacal impregnating solution of the nickel and the molybdenum be employed. As used herein, the term "ammoniacal" includes ammonia or an ammonia derivative having the properties of ammonia for the purposes of the present invention, namely: (a) the ability in aqueous solution to dissolve both the nickel sulfate and molybdenum oxides of the present invention; (b) a boiling point below that of water; and (c) it will not leave a residue on the catalyst on heating which will interfere with the catalyst activity. Ammonia is the preferred alkaline component of the impregnating solution, because it is inexpensive and leaves the impregnating solution readily on heating.

When the catalyst support is immersed in an ammoniacal impregnating solution and then heated, the alkaline component, e.g., ammonia, is advantageously driven off prior to the water in the impregnating solution. As soon as ammonia is driven from the catalyst, the pH of the impregnating solution falls, and the nickel sulfate and molybdenum are thereby deposited on the catalyst support in the desired structural configuration. It is essential that nickel in the form of nickel sulfate be utilized. Without limiting the present invention to any particular theory or mechanism, it is believed that the sulfate ion, $SO_4^-$, acts as "traffic director" and directs the deposition of the nickel and molybdenum to provide the spacial arrangement necessary for high catalyst activity.

As indicated previously, the catalyst support is impregnated with the impregnating solution of the present invention in a single step, while employing the "incipient wetness" technique. Such technique is well known and requires that the volume of impregnating solution be predetermined so as to provide the minimum volume which will just wet the entire surface of the support, with no excess liquid. Accordingly, since the impregnating solvent is utilized in a one-step impregnation of the catalyst support, it is necessary that the impregnating solution contain the amounts of nickel and molybdenum that are required in the final catalyst composite.

Surprisingly, it was found that when preparing the impregnating solution the nickel sulfate could not be added directly to the ammoniacal solution of the molybdenum and obtain a minimum volume of solvent containing the dissolved metals. Rather, the nickel sulfate must be predissolved in a separate ammoniacal solution, i.e., in ammonium hydroxide, which is subsequently admixed with an ammoniacal $Mo^{+VI}$ oxide solution, so as to obtain a higher weight of metals per unit volume of impregnating solution. In this manner a greater amount of nickel and molybdenum can be dissolved and loaded per unit volume of the resulting impregnation solution so as to provide a higher weight of nickel and molybdenum in the resulting catalyst composite by means of the one-step, minimum volume incipient wetness technique.

Any suitable support material may be employed, including those conventionally used for desulfurization of hydrocarbon feedstocks, such as the refractory inorganic oxides including alumina, silica, zirconia, titania, magnesia, thoria, boria and the like, or combinations thereof. A preferred support is a non-cracking support, such as alumina.

The volume of impregnating solution is predetermined so as to utilize a minimal volume for the one-step impregnation, which volume of impregnating solution must contain the required amount of nickel and molybdenum so as to provide the desired amount for the final catalyst. The determination of such volumes will thus depend upon the surface area and pore volume of the support. The determination of this volume is well within the skill of the art.

Since all of the nickel supplied to the catalyst of the present invention is preferably derived from nickel sulfate, the desired ratio is easily controlled and provided by the impregnating solution of the present invention. Thus, in order to obtain the full advantage of the present invention, substantially all and preferably the entire amount of nickel supplied to the catalyst is derived from nickel sulfate, so that essentially the sole source of the nickel in the impregnating solution is nickel sulfate. In this manner, a compatible solution of nickel and molybdenum is provided which may be used in a one-step impregnation of the catalyst support.

If desired, the resulting impregnated catalyst composite may be subjected to calcining temperatures sufficiently moderate so that substantial sulfate decomposition does not occur, since such decomposition will result in a catalyst having reduced hydrodesulfurization activity for naphthas, as previously indicated. Thus, the impregnated catalyst may be heated, in an oxygen-containing atmosphere, for example, air, to a maximum temperature no higher than 1000° F. (538° C.), for example, 800° F. (427° C.) to 1000° F. (538° C.), when the catalyst is to be used for sulfur removal from naphthas. As indicated previously, the temperature utilized has a direct relationship to the amount of sulfate radicals destroyed.

When the catalyst of the present invention is to be used for hydrodesulfurization of middle distillate and asphalt-containing oils, the impregnated and dried catalyst support may be calcined at a temperature up to about 1175° F. (635° C.). For desulfurization of middle distillate oils, the preferred calcination temperature range is between about 500° F. (260° C.) and about 1050° F. (566° C.), especially between about 800° F. (427° C.) and about 1050° F. (566° C.). For asphalt-containing feedstocks, the preferred calcination temperature range is between about 900° F. (482° C.) and about 1050° F. (566° C.), especially between about 950° F. (510° C.) and about 1000° F. (538° C.).

A calcination temperature range of between about 950° F. (510° C.) and about 1050° F. (566° C.) may be utilized.

Surprisingly, it has been found that in order to provide the most highly active hydrodesulfurization catalyst for an asphalt-containing oil, the impregnated and dried support should be calcined at a temperature high enough to decompose at least a portion of the sulfate radicals present. This is in contrast to the preparation of the most highly active hydrodesulfurization catalyst of the present invention for desulfurization of a naphtha feedstock, wherein the impregnated and dried catalyst support is preferably calcined at a temperature below 752° F. (400° C.) and most preferably below 500° F. (260° C.) in order to avoid sulfate decomposition.

The following examples illustrate the present invention, and are not intended to limit the invention, but rather, are presented merely for purposes of illustration. In this application the quantity of impregnated metal is reported as elemental metal.

EXAMPLE 1

Preparation Of Impregnation Solution

An ammoniacal solution of nickel sulfate is prepared by dissolving 69.57 grams of $NiSO_4.6H_2O$ in concentrated ammonium hydroxide (29.3 percent $NH_3$) and diluting to about 175 ml. with distilled water to form a solution A. Meanwhile, 85.56 grams of ammonium heptamolybdate were dissolved in 37.4 ml. of concentrated ammonium hydroxide and distilled water and diluted with distilled water to form approximately 290 ml. of a solution B.

Solution A is admixed with solution B and diluted with a volume of about 40 ml. of concentrated ammonium hydroxide to a volume of about 505 ml.

EXAMPLE 2

Preparation Of Impregnated Catalyst

A catalyst is prepared by employing 492 grams of calcined 1/32 inch (0.079 cm.) diameter extruded alumina. The alumina particles are contacted with the admixture of solutions A and B as prepared in Example 1 using a one-step incipient wetness impregnation, which requires 505 ml. of the impregnation solution. The catalyst support is contacted with the impregnating solution under ambient conditions.

Next, the impregnated mass is oven dried at 248° F. (120° C.) for approximately 24 hours. Thereafter, the dried mass was calcined in air, at 1000° F. (538° C.) for 10 hours.

The resulting catalyst composition contained 2.7 percent by weight nickel and 8 percent by weight molybdenum based on total catalyst weight.

EXAMPLE 3

Tests were conducted to ascertain the activity of the cobalt-free nickel-molybdenum catalyst prepared as in Example 2 in a residual oil hydrodesulfurization process, as compared to the operation of a similar hydrodesulfurization reactor operated under similar conditions, except for the use of a commercial nickel-cobalt-molybdenum catalyst.

In these tests, separate portions of an asphalt-containing 650° F.+(343° C.+) Kuwait ATB containing 3.8 weight percent sulfur were hydrodesulfurized at a hydrogen pressure of 1950 psig (136.5 kg/cm$^2$) employing a hydrogen rate of 7400 SCF/B (1317 cubic meters/cubic meter). One portion of the feed oil was passed with hydrogen through a one-stage reactor containing catalyst particles comprising 0.5 wt. % nickel, 1 wt. % cobalt and 8 wt. % molybdenum, supported on an alumina support. A second portion of the feed oil was passed through a one-stage reactor containing the catalyst produced from the impregnating solution of the present invention produced according to Example 2 in the form of particles containing 2.7 wt. % nickel and 8.0 wt. % molybdenum on an alumina support, thus, omitting the cobalt of the first catalyst.

The liquid hourly space velocity in each test was 0.88 volumes of oil per volume of catalyst per hour. The temperature with each catalyst was increased gradually with catalyst age so that a constant liquid product containing 0.95 weight percent of sulfur was recovered from each reactor. The reactant flow through each catalyst bed was continued for about five days.

The following table shows the temperature required to maintain the product sulfur level at 0.95 weight percent:

TABLE 1

| Age, days | Temperatures, °F. (°C.) | |
|---|---|---|
| | Ni—Co—Mo/Alumina | (NiMo/Alumina |
| 1.0 | 696 (369) | 674 (357) |
| 1.5 | 696 (369) | 674 (357) |
| 2.0 | 696 (369) | 674 (357) |
| 2.5 | 698 (370) | 676 (358) |
| 3.0 | 700 (371) | 676 (358) |
| 3.5 | 703 (373) | 678 (359) |
| 4.0 | 701 (372) | 679 (359) |
| 4.5 | 703 (373) | 679 (359) |
| 5.0 | 705 (374) | 679 (359) |

Figure 1:
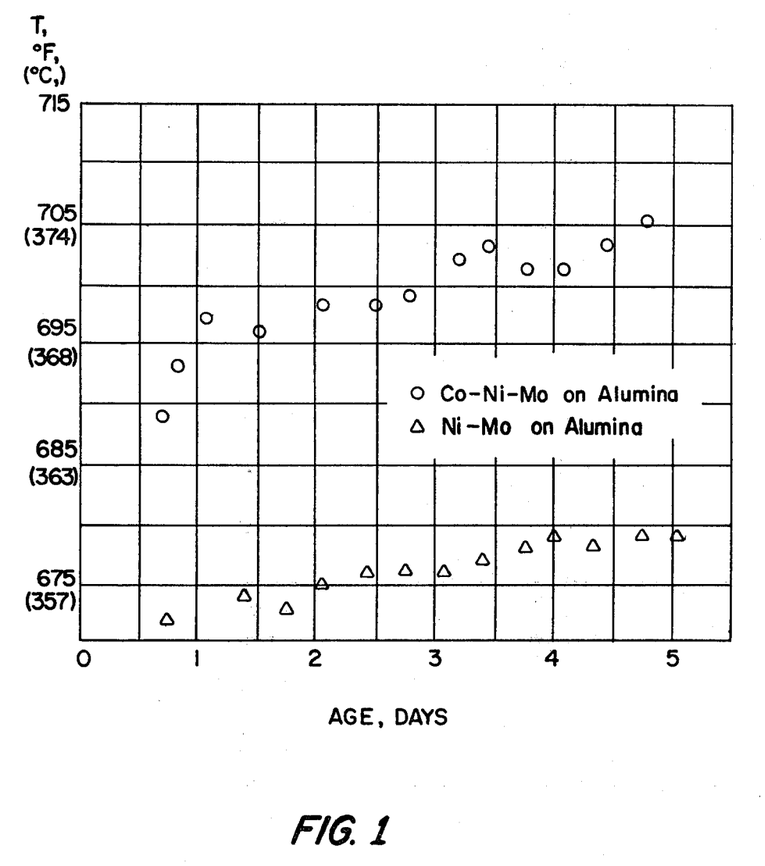
FIG. 1 shows a comparison between the catalyst of the present invention and a commercial nickel-cobalt-molybdenum catalyst for the hydrodesulfurization of asphalt-containing residual oils.

Table 1 shows a temperature advantage for the cobalt-free catalyst of this invention. This temperature advantage is also indicated in FIG. 1 which shows the temperature requirements with each catalyst over the period of the test. FIG. 1 shows that the temperature requirements for the cobalt-free catalyst were lower than the temperature requirements for the commercial cobalt-containing catalyst, indicating a relatively higher catalyst activity for the cobalt-free catalyst. FIG. 1 shows the surprising result that the catalyst of the present invention maintains an average temperature advantage of 20° F. (11° C.) over the period of the test, which is a significant advantage when considering that the NiMo catalyst omits a component, namely cobalt, which has been heretofore considered necessary for high desulfurization activity.

EXAMPLE 4

Further tests were conducted wherein the NiCoMo commercial catalyst of Example 3 was compared with catalysts produced using the impregnating solution of the present invention, but wherein greater amounts of nickel and molybdenum were contained in the catalyst, as compared with the catalyst of the previous example. In these tests, a single stage hydrodesulfurization reactor was operated with separate portions of the Kuwait ATB feed of the previous example employing a hydrogen pressure of 2000 psi (140 kg/cm$^2$) and a hydrogen rate of 5000 SCF/B (890 cubic meters/cubic meter). The temperature in each test was 700° F. (371° C.). In one test the NiCoMo on alumina catalyst of the previous example was used, while in two other tests, a catalyst produced using the impregnating solution of the present invention comprising 3 wt. % nickel and 9 wt. % molybdenum on alumina, and 4 wt. % nickel and 12 wt. % molybdenum on alumina, respectively, were employed.

The results of these tests are shown in Table 2 below:

TABLE 2

| | Product Sulfur (Wt. %) | | |
|---|---|---|---|
| Age days | Ni—Co—Mo/ Alumina | 3Ni—9Mo/ Alumina | 4Ni—12Mo/ Alumina |
| 1.0 | .90 | .82 | .89 |
| 1.5 | .85 | .88 | .93 |
| 2.0 | .93 | .93 | .97 |
| 2.5 | .94 | .96 | 1.00 |
| 3.0 | .98 | .97 | 1.03 |
| 3.5 | .975 | .97 | 1.04 |
| 4.0 | .99 | 1.00 | 1.05 |

The results of these tests indicate that with the higher amounts of nickel and molybdenum, the cobalt-free catalyst is approximately equivalent to the commercial NiCoMo catalyst. The results of these tests indicate that the product obtained using the cobalt-free catalyst contained approximately the same amount of sulfur as is realized with the conventional cobalt containing catalyst.

Thus, these tests indicate that a process employing the cobalt-free catalyst of this invention can achieve equivalent hydrodesulfurization as compared to a process employing a commercial NiCoMo catalyst. Moreover, when the amount of nickel and molybdenum utilized in the hydrodesulfurization catalyst of the present invention is reduced, there is not only an economic savings, but the resulting cobalt-free catalyst is superior rather than equivalent to the conventional NiCoMo catalyst.

The following examples demonstrate that the nickel-molybdenum catalyst utilized in the hydrodesulfurization process of the present invention, wherein asphaltic hydrocarbon feedstocks are desulfurized, provides high activity for desulfurization of naphtha feedstocks, particularly when utilized with a higher nickel and molybdenum content.

EXAMPLES 5–10

Tests were conducted using the present catalyst employing differing amounts of nickel and molybdenum. Each test was performed using separate portions of a blend comprising straight run and coker naphthas as a feedstock in the same reactor at separate times. Each test was performed using a total pressure of 640 psi (44.8 kg/cm$^2$) with a hydrogen circulation rate of 690 SCF of hydrogen per barrel (123 cubic meters/cubic meter).

Catalyst A

For comparative purposes a NiMoP on alumina catalyst was prepared at a low pH using phosphoric acid, and employing nickel nitrate rather than nickel sulfate as the nickel source. The impregnated alumina was calcined at 1000° F. (538° C.) and the alumina employed provided a finished catalyst packed density of 0.87 grams/cc. The packed density indicates the weight of catalyst that can be packed into the reactor. The catalyst composition comprised 4.4 weight percent nickel, 13.8 weight percent molybdenum and 3.0 weight percent phosphorus on alumina.

Catalyst B

For purposes of comparison a catalyst was prepared using an impregnating solution of this invention containing nickel sulfate, employing a one-step impregnation procedure and using the incipient wetness technique followed by calcination of the impregnated catalyst at 1000° F. (538° C.). The finished catalyst packed density was 0.72 grams per cc. The composition of the resulting catalyst was 3 weight percent nickel, 10 weight percent molybdenum.

Catalysts C and C'

The procedure used in preparing catalyst B was repeated with the exception that a higher metals level was employed in the impregnation solution, and the impregnated catalyst was calcined at a temperature of 800° F. (427° C.) (Catalyst C) and had a packed density of 0.73 grams per cc. A second batch of the same catalyst was calcined at the lower temperature of 500° F. (260° C.) (Catalyst C') and had a packed density of 0.70 grams per cc. The resulting catalyst of each batch had a composition of 4 weight percent nickel and 12 weight percent molybdenum.

Catalysts D and D'

The very same procedure was followed as in preparing Catalyst B, with the exception that the metals level of the impregnation solution was adjusted to provide 3 weight percent nickel and 10 weight percent molybdenum on the alumina support. One batch of this catalyst was calcined at a temperature of 800° F. (427° C.) (Catalyst D) while another batch of the impregnated catalyst support was calcined at 500° F. (260° C.) (Catalyst D'). Both batches had a packed density of 0.67 grams per cc.

The activities of the foregoing catalysts for denitrogenation and desulfurization of the naphtha feedstocks is shown in Table 3.

TABLE 3

| Example No. | Catalyst | Calcination Temperature, °F. (°C.) | Product Nitrogen, ppm Denitrogenation Temperature, °F. (°C.) | | | Product Sulfur, ppm Desulfurization Temperature, °F. (°C.) | | |
|---|---|---|---|---|---|---|---|---|
| | | | 495 (257) | 510 (266) | 525 (274) | 495 (257) | 510 (266) | 525 (274) |
| 5 | A | 1000 (538) | 2.9 | 1.5 | 0.4 | 248 | 57 | 17 |
| 6 | B | 1000 (538) | 1.3 | 0.7 | 0.3 | 75 | 2 | 1 |
| 7 | C | 800 (427) | 1.5 | <0.2 | <0.2 | 32 | 3.5 | 1.1 |
| 8 | C' | 500 (260) | 0.7 | <0.2 | 0.4 | 7 | 1.1 | 0.8 |
| 9 | D | 800 (427) | 1.95 | 1.2 | 0.5 | 40 | 9 | 3.5 |
| 10 | D' | 500 (260) | 1.3 | 0.6 | <0.2 | 30 | 7.5 | 1.3 |

The data in Table 3 show that the catalyst used in the hydrodesulfurization process of the present invention are highly active for denitrogenation and desulfurization of naphthas as compared with a conventional naphfining catalyst A, particularly in view of the fact that catalyst A had the highest packed density. Moreover, the data of Table 3 indicate that catalyst C, which had a higher metals content of nickel and molybdenum, was more active for desulfurization of the naphtha than was either catalyst B or catalyst D, which catalysts have a lower metals composition. Likewise, catalyst C tended to be more active for denitrogenation than either catalyst B or catalyst D. Thus, the data of Table 3 further demonstrate that a relatively higher metals content of nickel and molybdenum is desirable when using the hydrodesulfurization catalyst of the present invention in a naphtha desulfurization process.

Additionally, the data of Table 3 show that when a lower calcining temperature of 500° F. (260° C.) is used as compared with the 800° F. (427° C.) temperature, a substantial improvement is realized in regard to both denitrogenation and desulfurization activity of the naphtha feedstock, however, this disadvantage disappears at higher temperatures.

EXAMPLE 11

The effect of calcination temperature upon activity of the present NiMo catalyst for sulfur removal from an asphalt-containing feedstock is shown by the following test.

A NiMo catalyst was prepared according to Example 2, except that the final calcination temperature was 800° F. (427° C.) rather than 1000° F. (538° C.). This catalyst was tested using the same feed oil and conditions of Example 3.

It was found that this NiMo catalyst was approximately 10° F. (6° C.) less active for sulfur removal than was the NiMo catalyst of Example 3, although it still had desulfurization activity superior to the NiCoMo catalyst of that example.

EXAMPLE 12

The effect of calcination temperature upon the sulfate concentration of the impregnated NiMo catalyst is shown by preparing a catalyst in accordance with the present invention containing 2.7 weight percent nickel and 8.0 weight percent molybdenum on alumina. Separate samples of the impregnated and dried catalyst were calcined at four different temperatures, indicated in Table 4. After calcination, the mol fraction of nickel present as nickel sulfate was measured. The results are set forth in Table 4.

TABLE 4

| Final Calcination Temperature | | Mole Fraction Nickel Present |
|---|---|---|
| °F. | (°C.) | as NiSO$_4$ |
| 500 | (260) | 1.0 |
| 806 | (430) | .975 |
| 1004 | (540) | .56 |
| 1202 | (650) | 0.00 |

Figure 2:
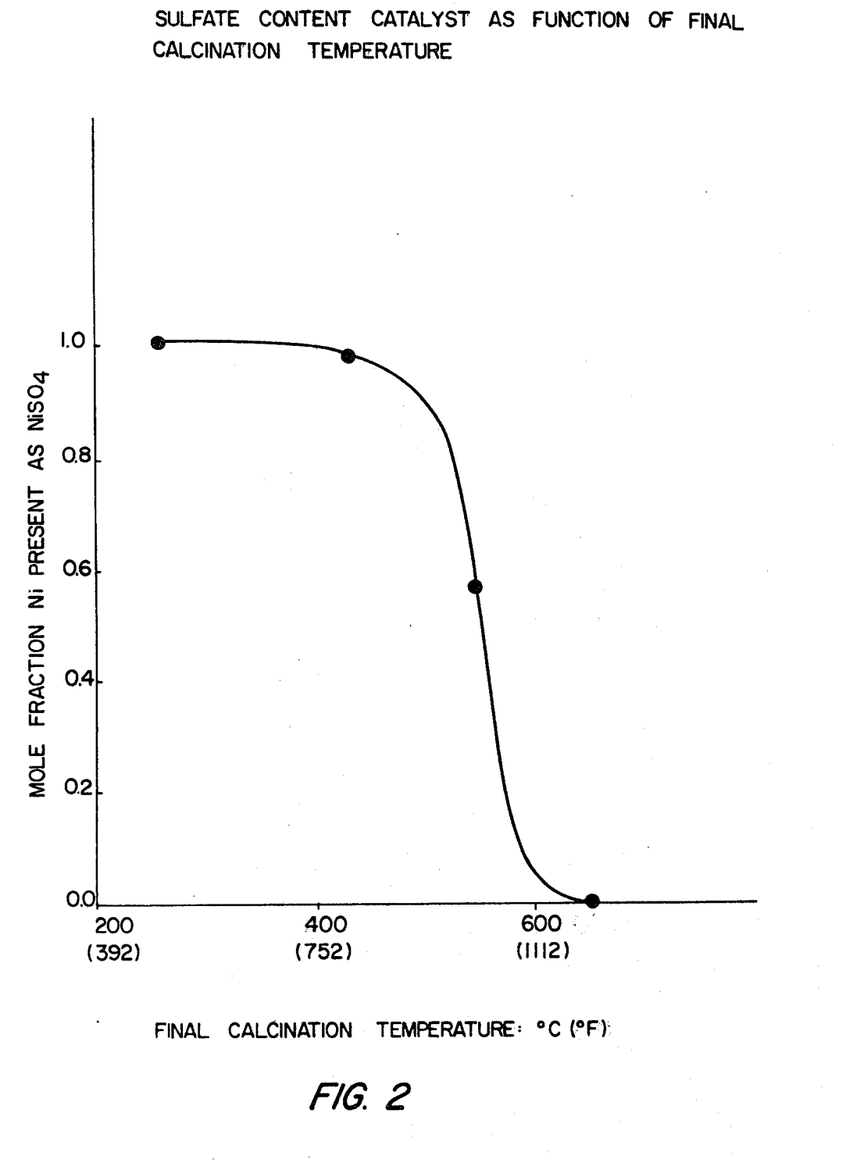
FIG. 2 shows the effect of calcination temperatures upon the sulfate content of the impregnated catalyst.

The data in Table 4 are presented graphically in FIG. 2.

FIG. 2 shows that as the calcination temperature was raised, the nickel present as nickel sulfate is substantially stable until about 400° C. (752° F.), and thereafter destruction of the sulfate in the catalyst structure begins to occur very rapidly as temperatures are increased up to 650° C. (1202° F.) where all of the sulfate is destroyed.

EXAMPLES 13–16

The following tests were conducted wherein a naphtha feedstock was desulfurized using a NiMo catalyst of this invention prepared by the one-step impregnation procedure, as contrasted with a commercial catalyst prepared by a two-step impregnation procedure wherein nickel and molybdenum are separately impregnated onto the catalyst support.

Catalyst E

This catalyst is a catalyst of the present invention and was prepared using the one-step impregnation procedure as previously described employing an impregnation solution sufficient to provide an alumina supported catalyst containing 5 weight percent nickel and 15 weight percent molybdenum prepared by the incipient wetness technique of impregnation.

Catalyst F

For the purposes of comparison the procedure for Catalyst E was used, except that a two-step impregnation procedure was used wherein an alumina support is treated with an aqueous solution of ammonium heptamolybdate and then oven dried at about 250° F. (121° C.). Next, the catalyst support is impregnated with nickel nitrate and oven dried at 250° F. (121° C.). The catalyst is then calcined at 1000° F. (538° C.). The resulting catalyst contained 5 weight percent nickel and 15 weight percent molybdenum.

Catalyst G

For purposes of comparison, a catalyst was prepared using a acidic, low pH phosphoric acid impregnating solution with a one-step impregnation so that the finished catalyst contained 5 weight percent nickel, 15 weight percent molybdenum and 3 weight percent phosphorus on alumina.

Catalyst H

This catalyst was prepared using a one-step impregnation technique wherein a nickel molybdenum complex is admixed with nickel nitrate in order to provide an impregnation solution that will result in an alumina supported catalyst containing 5 weight percent nickel and 15 weight percent molybdenum.

Each of catalysts E, F, G and H were utilized to desulfurize separate portions of a naphtha feedstock under similar conditions. The results are shown in Table 5 below.

TABLE 5

| Example Nos. | Catalyst | Product Sulfur, ppm Desulfurization Temperature °F. (°C.) | |
|---|---|---|---|
| | | 525° F. (274° C.) | 540° F. (282° C.) |
| 13 | E | 1.7 | .75 |
| 14 | F | 5.9 | 1.40 |
| 15 | G | 12.0 | 1.80 |
| 16 | H | 38.0 | 4.40 |

As seen in Table 5, Catalyst E, a catalyst of the present invention, provided the highest activity for desulfurization of the naphtha at the temperatures utilized and demonstrates not only improved activity as compared to the two-step impregnation catalyst F, but also was far superior to the nickel-molybdenum-phosphorus catalyst G and the nickel-molybdenum catalyst H, wherein the nickel was provied via a complex and a nickel nitrate solution, rather than wholly from a nickel sulfate solution as in the case of catalyst E.

EXAMPLE 17

Desulfurization Of Middle Distillate Oil

A test was conducted to compare the activity of the hydrodesulfurization catalyst of the present invention to the activity of a commercial CoMo on alumina catalyst for hydrodesulfurizing a middle distillate oil having the following inspections:

| Gravity, Degrees API | 26.6 |
|---|---|
| Distillation, vacuum, D86 °C. (°F.) | |
| O.P. | 217 (422) |
| 5% | 242 (468) |
| 10% | 250 (482) |
| 30% | 267 (512) |
| 50% | 278 (532) |
| 70% | 289 (552) |
| 90% | 309 (588) |
| 95% | 317 (606) |
| E.P. | 339 (642) |

Separate portions of the aforesaid middle distillate oil were desulfurized in independent hydrodesulfurization runs. The catalyst of one run was prepared in the manner of Example 2 using an impregnating solution similar to that of Example 1 and contained 4 percent by weight nickel and 12 percent by weight molybdenum on alumina. The catalyst of the other run was a commercial cobalt-molybdenum catalyst containing 2.4 weight percent cobalt and 10.0 weight percent molybdenum on alumina. Both tests were conducted employing a total pressure of 600 psig (42 kg/cm$^2$) with a hydrogen rate of 1000 SCF/barrel (178 cubic meters/cubic meter) utilizing 80 percent hydrogen and a liquid hourly space velocity of 5.0. The feed contained 1.15 percent by weight sulfur, and the catalysts exhibited the following desulfurization activities:

TABLE 6

| | Desulfurization (Percent) | |
|---|---|---|
| | 600° F. (316° C.) | 625° F. (329° C.) |
| 4% Ni, 12% Mo | 78 | 85.4 |
| 2.4% Co, 10% Mo | 77 | 84.4 |

As seen from Table 6, the catalyst produced from the impregnating solution of the present invention provides a slightly higher activity for desulfurizing a middle distillate oil as compared to the commercial CoMo catalyst.

EXAMPLE 18

Desulfurization Of Straight Run Vacuum Gas Oil

A test was conducted to compare the activity of the NiMo-alumina catalyst of the present invention to the activity of a commercial CoMo-alumina catalyst for hydrodesulfurization of a straight run heavy gas oil having the following inspections:

| Gravity, Degrees API | 23.3 |
|---|---|
| Distillation, vacuum, D 1160, °C. (°F.) | |
| 5% | 357 (675) |
| 10% | 573 (703) |
| 30% | 413 (776) |
| 50% | 441 (826) |
| 70% | 469 (876) |
| 90% 512 (953) | |
| 95% | 557 (1035) |

Comparative tests were conducted employing the same two catalysts as were used in Example 16 to desulfurize the higher boiling heavy gas oil (vacuum gas oil).

In each of the tests the total pressure was 800 psig (56 kg/cm$^2$), the hydrogen gas rate was 2000 SCR/B (356 cubic meters/cubic meter) (80 percent hydrogen), and the liquid hourly space velocity was 2 volumes of liquid per volume of catalyst per hour. The feed contained 1.83 percent by weight sulfur, and the results were as follows:

TABLE 7

| | Desulfurization (Percent) Desulfurization Temperature | |
|---|---|---|
| Catalyst | 690° F. (366° C.) | 720° F. (382° C.) |
| 4% Ni, 12% Mo | 83.4 | 90.0 |
| 2.4% Co, 10% Mo | 89.6 | 94.0 |

As seen from the data of Table 7, the NiMo hydrodesulfurization catalyst of the present invention was inferior to the commercial CoMo catalyst providing a desulfurization level, for example, of about 6 percentage points lower under comparable test conditions.

Accordingly, the foregoing Examples demonstrate that while the NiMo catalyst of the present invention provides a naphtha desulfurization catalyst which is clearly superior to a conventional, commercial desulfurization catalyst and is an active hydrodesulfurization catalyst for middle distillate oils, it does not provide desulfurization activity that is comparable to commercial desulfurization catalysts when used for straight run heavy gas oils. Thus, one would expect that when treating even higher boiling asphalt-containing residual oils, the desulfurization activity of such catalyst would decline even further. This was not the case. On the contrary, the present catalyst provides superior desulfurization activity when employed for hydrodesulfurization of the asphalt-containing feedstocks, despite the fact that the 675° F.+(357° C.+) gas oil has a boiling range within that of the residual oil used in the foregoing hydrodesulfurization tests.

EXAMPLE 19

Comparison Showing Requirement For Predissolved Nickel Sulfate

In order to demonstrate the unique nature of the impregnation solution utilized to produce the catalyst used in the hydrodesulfurization process of the present invention, an impregnation solution was prepared by adding 8.4 grams of $NiSO_4.6H_2O$ salt directly to 25 milliliters of a clear aqueous solution of ammonium molybdate heptahydrate (which includes 10.33 grams of solids and 4.5 ml. of ammonium hydroxide). The resulting solution turned a cloudy green color and did not become clear blue until approximately 20 ml. more of ammonium hydroxide was added. The resulting solution had a pH of 9.2 and contained approximately 24.5 ml. of ammonium hydroxide.

For comparative purposes 8.4 grams of $NiSO_4.6H_2O$ was mixed with ammonium hydroxide in order to determine the minimum addition necessary to dissolve the $NiSO_4.6H_2O$. Approximately a total of 17-18 ml. was required in order to obtain a clear blue solution of the nickel sulfate. The pH of this solution was 10.0. Next, the nickel sulfate solution was admixed with a fresh 25 ml. portion of the ammonium molybdate heptahydrate solution of the previous paragraph, and the resulting solution was clear blue, had a pH of 8.4 and contained approximately 21.5-22.5 ml. of ammonium hydroxide.

The aforesaid comparison demonstrates that a smaller volume of solvent, viz., ammonium hydroxide is required to completely dissolve the nickel sulfate, if the nickel sulfate is first dissolved in an ammoniacal solution and then added to the ammonium molybdate solution to provide the required impregnating solution as compared with the direct addition of undissolved nickel sulfate to the ammonium molybdate solution. This is of particular significance when applying the impregnating solution of the present invention with the incipient wetness technique, since the use of the incipient wetness technique for impregnating a catalyst support requires that the desired metals be dissolved in a predetermined minimum volume of liquid. Thus, by predissolving the nickel sulfate, a smaller total volume of impregnating solution is required to dissolve a given quantity of metals, thus providing an elevated metals loading on the catalyst support by means of the one-step impregnating technique, when desired.

Additionally, the foregoing comparison is surprising, since the nickel sulfate was completely dissolved in the impregnating solution along with the molybdenum at a pH of 8.4, when the nickel sulfate had been predissolved prior to its addition to the ammoniacal solution of the molybdenum. On the other hand, a pH of 10 was required to dissolve the nickel sulfate in the ammonium hydroxide absent the molybdate.

The impegnating solution prepared by predissolving the nickel sulfate in ammonium hydroxide was then utilized to impregnate 36.0 grams of an alumina catalyst support, which was thereafter oven dried for 24 hours at 248° F. (120° C.) and then calcined at 1000° F. (538° C.) for 10 hours. The resulting catalyst contained 4 percent by weight nickel and 12 percent by weight molybdenum.

EXAMPLE 20

In order to demonstrate the uniqueness of the use of nickel in the form of nickel sulfate in the present invention, an attempt was made to determine the effect of predissolving nickel fluoride, rather than nickel sulfate in ammonium hydroxide.

An ammonium molybdate solution was prepared by dissolving 29.94 grams of ammonium molybdate in 13.1 ml. of ammonium hydroxide, and the solution was diluted to 50 ml. using distilled water. Next, 15.85 grams of 98 percent $NiF_2.4H_2O$ was slowly added to the ammonium molybdate solution resulting in a gelatinous mass. Concentrated ammonium hydroxide in 5 ml. increments was then added, and after the addition of 35 ml. of the ammonium hydroxide, the mixture had turned from a light green gel to a dark blue, almost clear solution. The solution was permitted to stand for 10 minutes and a clear solution resulted having a pH of 8.8.

For comparative purposes, 15.85 grams of $NiF_2.4H_2O$ were added in small increments to 20 ml. of concentrated ammonium hydroxide attempting to cut down on the amount of ammonium hydroxide utilized by pre-dissolving the nickel fluoride. As the nickel fluoride was added to the ammonium hydroxide, it dissolved to form a clear blue solution until about two-thirds of the total was added. However, as more ammonium hydroxide was added the solution turned murky and not clear, and after still further ammonium hydroxide was added, i.e., up to about 35 ml., the solution was still not clear. A portion of the nickel fluoride admixture was added to 50 ml. of the aforesaid ammonium molybdate solution along with 13.1 ml. of ammonium hydroxide in water. The resultant solution had a pH of 8.5. However, the resultant mixture was lighter blue and not as clear as the solution obtained in the previous example using predissolved nickel sulfate and ammonium hydroxide.

This example demonstrates that a reduced volume of inpregnating solution canot be achieved by predissolving nickel fluoride in ammonium hydroxide, as was the case with nickel sulfate.

Although the invention has been described in considerable detail with particular reference to certain preferred embodiments thereof, variations and modifications can be effected within the spirit and scope of the invention as described herein before, and as defined in the appended claims.

We claim:

1. A catalyst composite consisting essentially of a refractory inorganic oxide support impregnated with molybdenum and nickel, said catalyst composite having been formed by a process which consists essentially of contacting said refractory inorganic oxide support with an aqueous, alkaline impregnating solution consisting essentially of $NH_4^+$, $Ni^{++}$, $SO_4^{--}$, NS $MO^{+VI}$ using the one-step, incipient wetness technique and the volume of said impregnating solution necessary for such technique, said $Ni^{++}$ and $Mo^{+VI}$ being present in said impregnating solution in amounts sufficient to provide said catalyst composite with between about 1 and about 10 weight percent nickel and between about 44 and about 25 weight percent molybdenum, based upon total catalyst weight, substantially all of said nickel$^{++}$ being supplied from nickel sulfate, and heating said impregnated support to dry and calcine said catalyst composite, said calcination being an oxidative calcination conducted in the presence of an oxygen-containing gas at a temperature in the range of 427° and about 566° C. such that sulfate remains on said support.

2. The catalyst composite of claim 1, wherein said $Mo^{+VI}$ is supplied from an $Mo^{+VI}$ oxide.

3. The catalyst composite of claim 1, wherein said $Mo^{+VI}$ is supplied from molybdic acid.

4. The catalyst composite of claim 1, wherein said $Mo^{+VI}$ is supplied from ammonium heptamolybdate.

5. The catalyst composite of claim 1, wherein all of the $Ni^{++}$ is supplied from nickel sulfate.

6. The catalyst composite of claim 1, wherein said impregnated catalyst support is calcined at a temperature in the range of between about 510° to about 538° C., said catalyst composite containing between about 4 and about 20 weight percent molybdenum.

7. The catalyst composite of claim 1, wherein nickel is the sole Group VIII metal present in said catalyst composite.

8. The catalyst composite of claim 1, wherein said support is alumina.

9. The catalyst composite of claim 1, wherein said alkaline impregnating solution is prepared by admixing
   (a) an ammoniacal solution of nickel sulfate, and
   (b) an ammoniacal solution of an $Mo^{+VI}$ oxide.

10. The catalyst composite of claim 1, wherein said impregnated catalyst support contains $Ni^{++}$ and $SO_4^{--}$ in a molar ratio of 1/1 prior to calcination.

11. The catalyst composite of claim 1, wherein said impregnated catalyst support is calcined at a temperature in the range of between about 482° and about 566° C., said catalyst composite containing between about 4 and about 20 weight percent molybdenum.

12. The catalyst composite of claim 1, wherein said impregnated catalyst support is calcined at a temperature in the range of between about 510° and about 566° C., said catalyst composite containing between about 4 and about 20 weight percent molybdenum.

13. A process for the manufacture of a hydrogenation catalyst composite, which consists essentially of contacting a refractory inorganic oxide support with an aqueous, alkaline impregnating solution consisting essentially of $NH_4^+$, $Ni_4^{++}$, $SO^{--}$ and $Mo^{+VI}$ using the one-step, incipient wetness technique and the volume of said impregnating solution necessary for such technique, said $Ni^{++}$ and $Mo^{+VI}$ being present in said impregnating solution in amounts sufficient to provide said catalyst composite with between about 1 and about 10 weight percent nickel and between about 4 and about 25 weight percent molybdenum, based upon total catalyst weight, substantially all of said $Ni^{++}$ being supplied from nickel sulfate, and heating said impregnated support to dry and calcine said catalyst composite, said calcination being an oxidative calcination conducted at a temperature in the range of 427° and about 566° C. in the presence of an oxygen-containing gas such that sulfate remains on said support.

14. The process of claim 13, wherein all of the $Ni^{++}$ is supplied from nickel sulfate.

15. The process of claim 13, wherein said $Mo^{+VI}$ is supplied from an $Mo^{+VI}$ oxide.

16. The process of claim 13, wherein said $Mo^{+VI}$ is supplied from ammonium heptamolybdate.

17. The process of claim 13, wherein said $Mo^{+VI}$ is supplied from molybdic acid.

18. The process of claim 13, wherein said calcination is conducted at a temperature in the range of between about 482° and about 566° C. said catalyst composite containing between about 4 and about 20 weight percent molybdenum.

19. The process of claim 18, wherein said calcining temperature is in the range of between about 510° and about 566° C. said catalyst composite containing between about 4 and about 20 weight percent molybdenum.

20. The process of claim 13, wherein said catalyst support is contacted with said impregnating solution at ambient temperature and pressure.

21. The process of claim 13, wherein said support is alumina.

22. The process of claim 13, wherein said alkaline impregnating solution is prepared by admixing
   (a) an ammoniacal solution of nickel sulfate, and
   (b) an ammoniacal solution of an $Mo^{+VI}$ oxide.

23. The process of claim 13, wherein said impregnating solution is cobalt-free.

24. The process of claim 13, wherein said impregnated catalyst support contains $Ni^{++}$ and $SO_4^{--}$ in a molar ratio of 1/1 prior to calcination.

25. A process for the hydrodesulfurization of a naphtha fraction, which comprises contacting said fraction and hydrogen under desulfurization conditions with a composite catalyst consisting essentially of nickel and molybdenum impregnated on a support, said catalyst composite having been formed by a process which consists essentially of contacting said refractory inorganic oxide support with an aqueous, alkaline impregnating solution consisting essentially of $NH_4^+$, $Ni^{++}$, $SO_4^{--}$ and $Mo^{+VI}$ using the one-step, incipient wetness technique and the volume of said impregnating solution necessary for such technique, said $Ni^{++}$ and $Mo^{+VI}$ being present in said impregnating solution in amounts sufficient to provide said catalyst composite with between about 1 and about 10 weight percent nickel and between about 4 and about 25 weight percent molybdenum, based upon total catalyst weight, substantially all of said nickel being supplied from nickel sulfate, and heating said impregnated support to dry and calcine said catalyst composite, said calcination being an oxidative calcination conducted in the presence of an oxygen-containing gas at a temperature in the range of 427° and 538° C. such that sulfate remains on said support.

26. The process of claim 25, wherein said hydrodesulfurization process is conducted at a temperature in the range of between about 204° and about 427° C. and a hydrogen partial pressure of between about 10 and 1500 pounds per square inch.

27. The process of claim 25, wherein nickel is present in said catalyst in the amount of between about 2.5 and about 7.5 weight percent and molybdenum is present in an amount of between about 7 and about 20 weight percent, based upon total catalyst weight.

28. The process of claim 25, wherein said $Mo^{+VI}$ is supplied from ammonium heptamolybdate.

29. The process of claim 25, wherein said $Mo^{+VI}$ is supplied from molybdic acid.

30. The process of claim 25, wherein said impregnated catalyst support contains $Ni^{++}$ and $SO_4^{--}$ in a molar ratio of 1/1 prior to calcination.

31. The process of claim 25, wherein said impregnating solution is prepared by admixing
   (a) an ammoniacal solution of nickel sulfate, and
   (b) an ammoniacal solution of an $Mo^{+VI}$ oxide.

32. The process of claim 25, wherein nickel is the sole Group VIII metal present in said catalyst composite.

33. The process of claim 25, wherein all of the $Ni^{++}$ is supplied from nickel sulfate.

34. A process for the hydrodesulfurization of a middle distillate oil, which comprises contacting said oil and hydrogen under desulfurization conditions with a catalyst composite consisting essentially of nickel and molybdenum impregnated on a support, said catalyst composite having been formed by a process which consists essentially of contacting said refractory inorganic oxide support with an aqueous, alkaline impregnating solution consisting essentially of $NH_4^+$, $Ni^{++}$, $SO_4^{--}$ and $Mo^{+VI}$ using the one-step, incipient wetness technique and the volume of said impregnating solution necessary for such technique, said $Ni^{++}$ and $Mo^{+VI}$ being present in said impregnating solution in amounts sufficient to provide said catalyst composite with between about 1 and about 10 weight percent nickel and between about 4 and about 25 weight percent molybdenum, based upon total catalyst weight, substantially all of said nickel being supplied from nickel sulfate, and heating said impregnated support to dry and calcine said catalyst composite, said calcination being an oxidative calcination conducted in the presence of an oxygen-containing gas at a temperature in the range of 427° and 566° C. such that sulfate remains on said support.

35. The process of claim 34, wherein said hydrodesulfurization process is conducted at a temperature in the range of between about 260° and about 427° C. and a hydrogen partial pressure of between about 100 and about 600 pounds per square inch.

36. The process of claim 34, wherein nickel is present in said catalyst in the amount of between about 2.5 and about 7.5 weight percent and molybdenum is present in an amount of between about 7 and about 20 weight percent, based upon total catalyst weight.

37. The process of claim 34, wherein said $Mo^{+VI}$ is supplied from ammonium heptamolybdate.

38. The process of claim 34, wherein said support is alumina.

39. The process of claim 34, wherein said $Mo^{+VI}$ is supplied from an $Mo^{+VI}$ oxide.

40. The process of claim 34, wherein said $Mo^{+VI}$ is supplied from molybdic acid.

41. The process of claim 34, wherein said impregnated catalyst support contains $Ni^{++}$ and $SO_4^{--}$ in a molar ratio of 1/1 prior to calcination.

42. The process of claim 34, wherein nickel is the sole Group VIII metal present in such catalyst.

43. The process of claim 34, wherein said impregnating solution is prepared by admixing
(a) an ammoniacal solution of nickel sulfate, and
(b) an ammoniacal solution of an $Mo^{+VI}$ oxide.

44. The process of claim 34, wherein all of the $Ni^{++}$ is supplied from nickel sulfate.

45. A process for the hydrodesulfurization of an asphalt-containing oil, which comprises contacting said oil and hydrogen under desulfurization conditions with a catalyst composite consisting essentially of nickel and molybdenum impregnated on a support, said catalyst composite having been formed by a process which consists essentially of contacting said refractory inorganic oxide support with an aqueous, alkaline impregnating solution consisting essentially of $NH_4^+$, $Ni^{++}$, $SO_4^{--}$ and $Mo^{+VI}$ using the one-step, incipient wetness technique and the volume of said impregnating solution necessary for such technique, said $Ni^{++}$ and $Mo^{+VI}$ being present in said impregnating solution in amounts sufficient to provide said catalyst composite with between about 0.5 and about 8 weight percent nickel and between about 4 and about 20 weight percent molybdenum, based upon total catalyst weight, substantially all of said nickel being supplied from nickel sulfate, and heating said impregnated support to dry and calcine said catalyst composite, said calcination being an oxidative calcination conducted in the presence of an oxygen-containing gas at a temperature in the range of between about 482° and about 566° C. such that sulfate remains on said support.

46. The process of claim 45, wherein said hydrodesulfurization process is conducted at a temperature in the range of between about 260° and about 482° C. and a hydrogen partial pressure of between about 500 and 5000 pounds per square inch.

47. The process of claim 45, wherein nickel is present in said catalyst in the amount of between 1 and about 5 weight percent and molybdenum is present in an amount of between about 5 and about 15 weight percent, based upon total catalyst weight.

48. The process of claim 45, wherein said calcination is conducted at a temperature in the range of between about 510° and about 538° C.

49. The process of claim 45, wherein said $Mo^{+VI}$ is supplied by an $Mo^{+VI}$ oxide.

50. The process of claim 45, wherein said $Mo^{+VI}$ is supplied from molybdic acid.

51. The process of claim 45, wherein said $Mo^{+VI}$ is supplied from ammonium heptamolybdate.

52. The process of claim 45, wherein said support is alumina.

53. The process of claim 45, wherein nickel is the sole Group VIII metal present in such catalyst.

54. The process of claim 45, wherein said impregnating solution is prepared by admixing
(a) an ammoniacal solution of nickel sulfate, and
(b) an ammoniacal solution of an $Mo^{+VI}$ oxide.

55. The process of claim 45, wherein said impregnated catalyst support contains $Ni^{++}$ and $SO_4^{--}$ in a molar ratio of 1/1 prior to calcination.

56. The process of claim 45, wherein all of the $Ni^{++}$ in said impregnating solution is supplied by nickel sulfate.

* * * * *

UNITED STATES PATENT AND TRADEMARK OFFICE
CERTIFICATE OF CORRECTION

PATENT NO. : 4,318,801                              Page 1 of 3
DATED      : March 9, 1982
INVENTOR(S): Lese, Sebulsky, Stanulonis, Tabacek and Vogel It is certified that error appears in the above—identified patent and that said Letters Patent is hereby corrected as shown below:

ABSTRACT, line 5, "$Ni^{++}$, $SO_4-$" should read --$Ni^{++}$, $SO_4^{=}$--.

Column 5, line 30, "$Ni^{++}$ and $SO_4--$" should read --$Ni^{++}$ and $SO_4^{=}$--;

line 38, "$(NH_4)_6Mo_7O_{24} \cdot 4H_2O$" should read --$(NH_4)_6Mo_7O_{24} \cdot 4H_2O$--.

Column 6, line 8, "$SO_4-$" should read --$SO_{\overline{4}}^{=}$--.

Column 7, line 58, "$NiSO_4 \cdot 6H_{20}$" should read --$NiSO_4 \cdot 6H_2O$--.

Column 8, Table 1, "(NiMo/Alumina" should read --NiMo/Alumina--.

Column 14, line 33, "90%512(953)" should read --90%    512(953)--;

line 39, "2000 SCR/B" should read --2000 SCF/B--.

UNITED STATES PATENT AND TRADEMARK OFFICE
CERTIFICATE OF CORRECTION

PATENT NO. : 4,318,801
DATED : March 9, 1982
INVENTOR(S) : Lese, Sebulsky, Stanulonis, Tabacek and Vogel It is certified that error appears in the above—identified patent and that said Letters Patent is hereby corrected as shown below:

Column 15, line 17, "$NiSO_4.6H_2O$" should read --$NiSO_4 \cdot 6H_2O$--;

line 26, "$NiSO_4.6H_2O$" should read --$NiSO_4 \cdot 6H_2O$--;

line 30, "$NiSO_4.6H_2O$" should read --$NiSO_4 \cdot 6H_2O$--;

Column 16, line 15, "$NiF_2.4H_2O$" should read --$NiF_2 \cdot 4H_2O$--;

line 23, "$NiF_2.4H_2O$" should read --$NiF_2 \cdot 4H_2O$--;

line 44, "canot" should read --cannot--;

line 51, "herein before" should read --hereinbefore--;

UNITED STATES PATENT AND TRADEMARK OFFICE
CERTIFICATE OF CORRECTION

PATENT NO. : 4,318,801                          Page 3 of 3

DATED      : March 9, 1982

INVENTOR(S) : Lese, Sebulsky, Stanulonis, Tabacek and Vogel

It is certified that error appears in the above—identified patent and that said Letters Patent is hereby corrected as shown below:

line 60, "$So_4$--," should read --$SO_4^=$,--;

line 66, "44" should read --4--;

line 68, delete "++".

Column 17, line 46, "SO--" should read --$SO^-$--;

Signed and Sealed this

Twenty-fifth Day of January 1983

[SEAL]

Attest:

GERALD J. MOSSINGHOFF

Attesting Officer     Commissioner of Patents and Trademarks